US011829167B2

(12) United States Patent
Ogisu

(10) Patent No.: US 11,829,167 B2
(45) Date of Patent: Nov. 28, 2023

(54) PULSE SHOT-TYPE FLOW RATE CONTROL DEVICE, PULSE SHOT-TYPE FLOW RATE CONTROL METHOD, AND PROGRAM

(71) Applicant: CKD CORPORATION, Komaki (JP)

(72) Inventor: Toshikazu Ogisu, Komaki (JP)

(73) Assignee: CKD CORPORATION, Komaki (JP)

( * ) Notice: Subject to any disclaimer, the term of this patent is extended or adjusted under 35 U.S.C. 154(b) by 0 days.

(21) Appl. No.: 17/799,980

(22) PCT Filed: Mar. 2, 2021

(86) PCT No.: PCT/JP2021/007897
§ 371 (c)(1),
(2) Date: Aug. 16, 2022

(87) PCT Pub. No.: WO2021/199847
PCT Pub. Date: Oct. 7, 2021

(65) Prior Publication Data
US 2023/0259146 A1 Aug. 17, 2023

(30) Foreign Application Priority Data
Mar. 30, 2020 (JP) ................................. 2020-061118

(51) Int. Cl.
G05D 7/06 (2006.01)
G01F 3/38 (2006.01)
G01F 15/00 (2006.01)

(52) U.S. Cl.
CPC ............. *G05D 7/0647* (2013.01); *G01F 3/38* (2013.01); *G01F 15/005* (2013.01); *G05D 7/06* (2013.01); *G05D 7/0635* (2013.01)

(58) Field of Classification Search
CPC ...... G05D 7/0647; G05D 7/06; G05D 7/0635; G01F 3/38; G01F 15/005;
(Continued)

(56) References Cited

U.S. PATENT DOCUMENTS 7,615,120 B2 * 11/2009 Shajii ................ C23C 16/45527
118/690
9,348,339 B2 * 5/2016 Ding ................ C23C 16/45557
(Continued)

FOREIGN PATENT DOCUMENTS

| JP | 4197648 B2 | 12/2008 |
| JP | 2009-54094 A | 3/2009 |
| JP | 2011-64707 A | 3/2011 |

OTHER PUBLICATIONS

May 25, 2021 International Search Report issued in International Patent Application No. PCT/JP2021/007897.
(Continued)

*Primary Examiner* — Minh Q Le
(74) *Attorney, Agent, or Firm* — Oliff PLC

(57) ABSTRACT

A pulse shot-type flow rate control device including first and second shutoff valves, a tank, a pressure sensor, and a controller is caused to perform two or more processes. In each process, the controller repeats pulse shots of alternately causing the first shutoff valve and the second shutoff valve to open and close, changes a way of the pulse shots based on a pressure difference between the pressure after filling and the pressure after discharge, and controls a volume flow rate. In each process, the controller stores, as an optimal filling time, a filling time when the volume flow rate is controlled to a target flow rate, and opens and closes the first shutoff valve by using the optimal filling time in a first pulse shot in the next process.

9 Claims, 6 Drawing Sheets

(58) Field of Classification Search
CPC .............. C23C 16/45523; C23C 16/52; C23C 16/45557; C23C 16/4412
USPC ........ 137/2, 487.5, 488; 156/345.15, 345.24, 156/345.26
See application file for complete search history.

(56) References Cited

U.S. PATENT DOCUMENTS

| | | | | |
|---|---|---|---|---|
| 10,649,471 | B2* | 5/2020 | Ding | G05D 7/0647 |
| 10,679,880 | B2* | 6/2020 | Penley | B05B 12/087 |
| 11,144,075 | B2* | 10/2021 | Mudd | G01F 1/363 |
| 11,269,362 | B2* | 3/2022 | Hirata | G05D 7/0647 |
| 2004/0244837 | A1 | 12/2004 | Nawata et al. | |
| 2009/0019943 | A1 | 1/2009 | Ozawa et al. | |
| 2009/0063059 | A1 | 3/2009 | Nakada et al. | |
| 2010/0125424 | A1* | 5/2010 | Ding | G05D 7/0647 702/47 |
| 2012/0073672 | A1* | 3/2012 | Ding | C23C 16/448 156/345.33 |
| 2012/0076935 | A1* | 3/2012 | Ding | G05D 7/0635 118/704 |
| 2013/0255793 | A1* | 10/2013 | Watanabe | G05D 7/0647 137/624.27 |
| 2014/0083514 | A1* | 3/2014 | Ding | G01F 15/046 137/12 |
| 2014/0190571 | A1* | 7/2014 | Ding | G05D 7/0635 137/1 |
| 2015/0228460 | A1* | 8/2015 | Mizutani | H01L 21/31138 156/345.24 |
| 2016/0299514 | A1* | 10/2016 | Ono | G05D 7/0647 |
| 2020/0081459 | A1* | 3/2020 | L'Bassi | G05D 7/0635 |
| 2021/0240208 | A1* | 8/2021 | Hirata | G01F 15/005 |
| 2023/0021102 | A1* | 1/2023 | Sugita | F16K 31/004 |
| 2023/0063288 | A1* | 3/2023 | Kadoya | G05D 7/0623 |

OTHER PUBLICATIONS

Sep. 29, 2022 International Preliminary Report on Patentability issued in International Patent Application No. PCT/JP2021/007897.

* cited by examiner

PULSE SHOT-TYPE FLOW RATE CONTROL DEVICE, PULSE SHOT-TYPE FLOW RATE CONTROL METHOD, AND PROGRAM

CROSS-REFERENCE TO RELATED APPLICATIONS

This is a US national phase application based on the PCT International Patent Application No. PCT/JP2021/007897 filed on Mar. 2, 2021, and claiming the priority to Japanese Patent Application No. 2020-061118 filed on Mar. 30, 2020, the entire contents of which are incorporated by reference herein.

TECHNICAL FIELD

The present invention relates to a pulse shot-type flow rate control device, a pulse shot-type flow rate control method, and a program, to regulate a volume flow rate of gas.

BACKGROUND ART

Conventionally, gas supply systems for semiconductor manufacturing apparatuses and others would use for example thermal mass flow controllers to accurately control the flow rate of gas. In recent years, high-temperature gases of 100° C. or higher may be targets for control, but the thermal mass flow controllers could not control such high-temperature gases.

For example, Patent Document 1 discloses a pulse shot-type flow rate control device that can control the flow rate of hot gas. This pulse shot-type flow rate control device is provided with a first shutoff valve connected to a gas source, a second shutoff valve connected to the first shutoff valve, a gas filling capacity provided between the first shutoff valve and the second shutoff valve, a pressure sensor for measuring the pressure in the gas filling capacity, and a controller.

The controller of the pulse shot-type flow rate control device repeats a pulse shot of causing the first shutoff valve to open and close and then causing the second shutoff valve to open and close, as shown in FIG. 5. In addition, the controller changes a filling time for filling gas by opening of the first shutoff valve in a next pulse shot based on a pressure difference D1 between the pressure (an after-filling pressure) P1 in the gas filling capacity after gas is filled by opening and closing of the first shutoff valve and the pressure (an after-discharge pressure) P2 in the gas filling capacity after the gas is discharged by opening and closing of the second shutoff valve, which pressures are obtained using the pressure sensor, thus changing the manner of the pulse shot to adjust the flow rate of gas to a target flow rate.

RELATED ART DOCUMENTS

Patent Documents

Patent Document 1: Japanese patent No. 4197648

SUMMARY OF INVENTION

Problems to be Solved by the Invention

However, the conventional art has some problems. In the conventional pulse shot-type flow rate control device, specifically, when the pulse shot is repeated to repeat the process for supplying gas, for example, gas usage conditions may vary from process to process. Meanwhile, the conventional pulse shot-type flow rate control device is configured to perform a first pulse shot in each process in the same manner and, as shown in FIG. 6, gradually change the manner of the pulse shot according to the pressure difference D1 in the pulse shot. Thus, the conventional pulse shot-type flow rate control device might require a long response time from the start of each process until the flow rate of gas is adjusted to the target flow rate.

The present invention has been made to address the above problems and has a purpose to provide a technique that can improve the response of a pulse shot-type flow rate control device configured to repeat a pulse shot to control a flow rate of gas to a target flow rate.

Means of Solving the Problems (1) To achieve the above-mentioned purpose, one aspect of the present disclosure provides a pulse shot-type flow rate control device comprising: a first shutoff valve connected to a gas source; a second shutoff valve connected to the first shutoff valve; a gas filling capacity between the first shutoff valve and the second shutoff valve; and a pressure sensor for measuring a pressure in the gas filling capacity, wherein two or more processes for controlling gas to a target flow rate are performed, the first shutoff valve, the second shutoff valve, and the pressure sensor are connected communicatively to a controller that controls operations of the pulse shot-type flow rate control device, in each of the processes, the controller executes a flow rate control processing of: repeating a pulse shot of causing the first shutoff valve to open and close and, after that, causing the second shutoff valve to open and close; calculating a volume flow rate of gas exhausted from the gas filling capacity based on a pressure after filling measured by use of the pressure sensor after the first shutoff valve is opened and closed to fill gas into the gas filling capacity and a pressure after discharge measured by use of the pressure sensor after the second shutoff valve is opened and closed to discharge gas from the gas filling capacity; and changing a manner of repeating the pulse shot to regulate the volume flow rate to the target flow rate, and the controller executes: an optimal pressure storage processing of storing, as an optimal pressure, the pressure after filling measured by the pressure sensor when the pulse shot that regulates the volume flow rate to the target flow rate is performed in the flow rate control processing, and the controller executes: before a first pulse shot is performed in a subsequent process to a process in which the optimal pressure storage processing is executed, a pressure control processing of regulating the pressure in the gas filling capacity to the optimal pressure stored in the optimal pressure storage processing, and then opening and closing the second shutoff valve.

In the pulse shot-type flow rate control device configured as above, the pressure after filling, i.e., the after-filling pressure, obtained when the volume flow rate in a certain process is regulated to the target flow rate is stored as the optimal pressure. In the subsequent process, the pressure in the gas filling capacity is controlled to the optimal pressure before the first pulse shot is performed, and thereafter the second shutoff valve is opened and closed. Accordingly, the tank comes into the same state as after execution of the pulse shot that regulates the volume flow rate to the target flow rate. Thus, in the first pulse shot, regardless of changes in for example the original pressure of a gas source, it is possible to fill gas into the tank in a similar way to when the volume flow rate has been regulated to the target flow rate. Thus, the volume flow rate is highly likely to be adjusted to the target flow rate. Consequently, the pulse shot-type flow rate control device configured as above can shorten the response time from the start of a process until the flow rate of gas stabilizes at, the target flow rate, thus achieving improved response.

(2) In the pulse shot-type flow rate control device described in (1), preferably, the optimal pressure storage processing is executed in a first-time process after power-on, and the pressure control processing is executed before the first pulse shot in a second or subsequent-time process after power-on.

In the pulse shot-type flow rate control device configured as above, after power-on, the optimal pressure storage processing is executed in the first-time process. This configuration can improve the response in each of second and subsequent-time processes.

(3) In the pulse shot-type flow rate control device described in (1) or (2), preferably, the controller executes the optimal pressure storage processing in the flow rate control processing in the process performed immediately after the pressure control processing, and updates the optimal pressure.

In the pulse shot-type flow rate control device configured as above, since the optimal pressure is updated in each process, the optimal pressure reflects disturbance. Thus, the first pulse shot is more likely to allow the volume flow rate to be adjusted to the target flow rate or a value close to the target flow rate.

(4) In the pulse shot-type flow rate control device described in any one of (1) to (3), preferably, the controller executes: an optimal filling time storage processing of: measuring an opening-operation maintaining time for keeping the first shutoff valve open in each pulse shot in the flow rate control processing; and storing, as an optimal filling time, the opening-operation maintaining time when the pulse shot that regulates the volume flow rate to the target flow rate is performed, and the controller further executes: for execution of the first pulse shot in the flow rate control processing in a subsequent process to the process in which the optimal fitting time storage processing is executed, a filling time control processing of opening and closing the first shutoff valve with the optimal filling time stored in the optimal filling time storage processing.

In the pulse shot-type flow rate control device configured as above, the pressure control is performed before a process, and further the first shutoff valve is controlled with the optimal filling time in the first pulse shot in each process. This configuration further increases the probability of regulating the volume flow rate to the target flow rate or a value close to the target flow rate from the first pulse shot, thus improving the response.

(5) In the pulse shot-type flow rate control device described in (4), preferably, the optimal filling time storage processing is performed in the same process as that in which the optimal pressure storage processing is performed.

In the pulse shot-type flow rate control device configured as above, the optimal pressure and the optimal filling time are stored in the same process. This configuration can save gas and time by eliminating the need to store the optimal filling time in a test mode separate from the process, (6) In the pulse shot-type flow rate control device described in (4) or (5), preferably, the optimal filling time is stored in the first-time process after power-on and is used in the second or subsequent-time process after power-on.

In the pulse shot-type flow rate control device configured as above, after power-on, the optimal filling time storage processing is executed in the first-time process. This configuration can improve the response in each of the second and subsequent-time processes.

(7) In the pulse shot-type flow rate control device described in any one of (4) to (6), preferably, the controller executes the optimal filling time storage processing in the flow rate control processing in the process in which the filling time control processing is performed, and updates the optimal filling time.

In the pulse shot-type flow rate control device configured as above, the optimal filling time is updated in each process and thus the optimal filling time reflects the disturbance. This configuration can further enhance the probability of regulating the volume flow rate in the first pulse shot to the target flow rate or a value close to the target flow rate, (8) Another aspect of the present invention provides a pulse shot-type flow rate control method, using a pulse shot-type flow rate control device comprising: a first shutoff valve connected to a gas source; a second shutoff valve connected to the first shutoff valve; a gas filling capacity between the first shutoff valve and the second shutoff valve; and a pressure sensor for measuring a pressure in the gas filling capacity, wherein operations of the pulse shot-type flow rate control device are controlled by a controller communicatively connected to the first shutoff valve, the second shutoff valve, and the pressure sensor, wherein the method causes the pulse shot-type flow rate control device to perform: two or more processes for controlling gas to a target flow rate; in each of the processes, a flow rate control step of: repeating a pulse shot of causing the first shutoff valve to open and close and, after that, causing the second shutoff valve to open and close; calculating a volume flow rate of gas exhausted from the gas filling capacity based on a pressure after filling measured by use of the pressure sensor after the first shutoff valve is opened and closed to fill gas into the gas filling capacity and a pressure after discharge measured by use of the pressure sensor after the second shutoff valve is opened and closed to discharge gas from the gas filling capacity; and changing a manner of repeating the pulse shot to regulate the volume flow rate to the target flow rate; an optimal pressure storage step of storing, as an optimal pressure, the pressure after filling measured by the pressure sensor when the pulse shot that regulates the volume flow rate to the target flow rate is performed in the flow rate control step; and before a first pulse shot is performed in a subsequent process to a process in which the optimal pressure storage processing is executed, a pressure control step of regulating the pressure in the gas filling capacity to the optimal pressure stored in the optimal pressure storage step.

(9) Still another aspect of the present invention provides a program installed in a controller for controlling operations of a pulse shot-type flow rate control device comprising: a first shutoff valve connected to a gas source; a second shutoff valve connected to the first shutoff valve; a gas filling capacity between the first shutoff valve and the second shutoff valve; and a pressure sensor for measuring a pressure in the gas filling capacity, wherein when the flow rate control device performs two or more processes for controlling gas to a target flow rate, the program causes the controller, in each of the processes, to execute: a flow rate control processing of: repeating a pulse shot of causing the first shutoff valve to open and close and, after that, causing the second shutoff valve to open and close; calculating a volume flow rate of gas exhausted from the gas filling capacity based on a pressure after filling measured by use of the pressure sensor after the first shutoff valve is opened and closed to fill gas into the gas filling capacity and a pressure after discharge measured by use of the pressure sensor after the second shutoff valve is opened and closed to discharge gas from the gas filling capacity; and changing a manner of repeating the pulse shot to regulate the volume flow rate to the target flow rate, and the program causes the controller to execute: an optimal pressure storage processing of storing, as an optimal pressure, the pressure after filling measured by the pressure sensor when the pulse shot that regulates the volume flow rate to the target flow rate is performed in the flow rate control processing, and the program further causes the controller to execute: before a first pulse shot is performed in a subsequent process to a process in which the optimal pressure storage processing is executed, a pressure control processing of regulating the pressure in the gas filling capacity to the optimal pressure stored in the optimal pressure storage processing.

Effects of the Invention

According to the present invention, therefore, a pulse shot-type flow rate control device for controlling a gas flow rate to a target flow rate by repeating pulse shots can achieve improved response.

MODE FOR CARRYING OUT THE INVENTION

A detailed description of an embodiment of a pulse shot-type flow rate control device, a pulse shot-type flow rate control method, and a program according to the present invention will now be given referring to the accompanying drawings.

Figure 1:
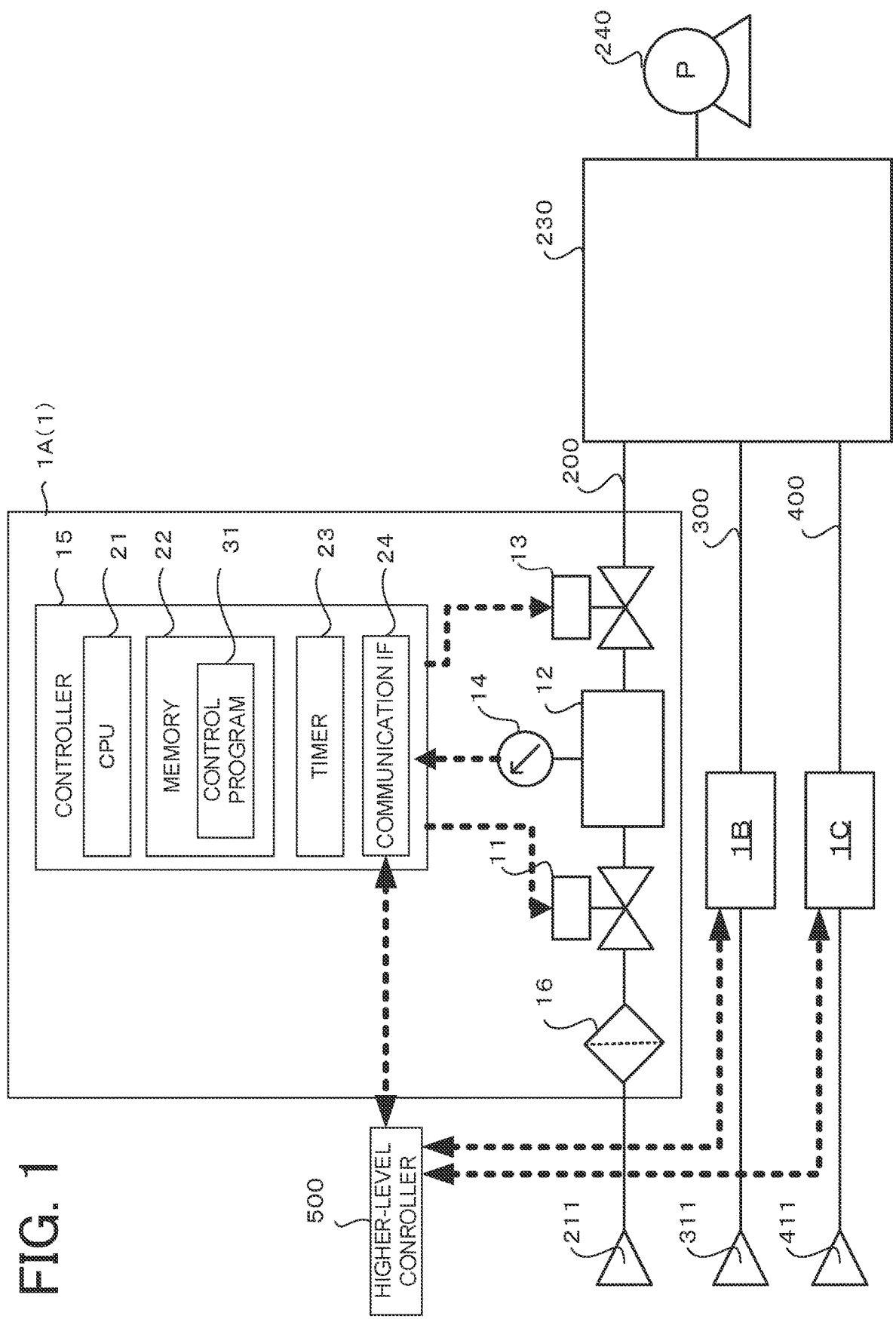
FIG. 1 is a schematic configuration diagram of a pulse shot-type flow rate control device in an embodiment of the present invention.

<Schematic Configuration of Pulse Shot Control Device Shot-Type Flow Rate Control Device In the present embodiment, as shown in FIG. 1, the present invention is applied to a pulse shot-type flow rate control device for controlling the flow rate of gas to be supplied to a chamber 230, which will be hereinafter abbreviated to a "flow rate control device".

In the chamber 230, which is controlled to a vacuum atmosphere by evacuation using a vacuum pump 240 for example, a predetermined film is formed on a wafer by an atomic layer deposition (Atomic Layer Deposition, hereafter abbreviated to "ALD"). In the ALD, a cycle of (a) supplying of raw material gas, (b) purging with inert gas, (c) supplying of reactive gas, and (d) purging with inert gas is repeated to adjust the film thickness of a film to be formed on a wafer in 0.1 μm increments.

In the ALD, if different kinds of gasses are mixed, they may solidify. Thus, a pipe 200 connected to a gas source 211 of raw material gas, a pipe 300 connected to a gas source 311 of reactive gas, and a pipe 400 connected to a gas source 411 of inert gas are separately connected to the chamber 230.

The raw material gas is for example TMA (trimethylaluminum). The reactive gas is for example $H_2O$ (water vapor). The inert gas is for example $N_2$ gas. TMA is a solid substance at room temperature and, when supplied to the chamber 230, it vaporizes to form a high-temperature gas of 120° C. or higher.

For film formation using the ALD, the amounts of various gases to be supplied are controlled by the time for supplying each gas. In the ALD, further, the above-described cycle of (a) to (d) is repeated several hundred times per wafer. In this case, for example, each of the time for supplying TMA in (a) and the time for supplying $H_2O$ in (c) respectively to the chamber 230 is several tens of milliseconds, and the time for supplying (purging) $N_2$ to the chamber 230 in each of (b) and (d) is several seconds to several tens of seconds. Thus, the gases to be supplied to the chamber 230 have to be controlled with high precision, high frequency, and high speed. For this purpose, the pipes 200, 300, and 400 are respectively equipped with flow rate control devices 1A, 1B, and 1C each configured to alternately cause a first shutoff valve 11 and a second shutoff valve 13 to open and close to control a flow rate.

The configuration of the flow rate control device 1 will be described concretely referring to FIG. 1. The flow rate control devices 1A to 1C have identical configurations and thus the following description is given to only the flow rate control device 1A provided on the pipe 200. These flow rate control devices are also collectively referred to as a "flow rate control device 1" unless they particularly need to be distinguished.

The flow rate control device 1 is provided with the first shutoff valve 11, a tank 12, the second shutoff valve 13, and a pressure sensor 14. The first shutoff valve 11 is placed upstream of the tank 12 and connected to the gas source 211 which is pressurized. The second shutoff valve 13 is placed downstream of the tank 12 and connected to the chamber 230 which is under vacuum atmosphere. The tank 12 is a hermetically closed space formed when the first shutoff valve 11 and the second shutoff valve 13 are closed. The tank 12 in the present embodiment has a volume of 5 to 1000 cc, for example. The tank 12 is one example of a "gas filling capacity". As an alternative, the gas filling capacity may be constituted of a pipe or pipes instead of the tank 12. The pressure sensor 14 is a vacuum pressure gauge for high temperatures. A filter 16 is located upstream of the first shutoff valve 11 and removes foreign substances from the gas flowing into the flow rate control device 1.

The first shutoff valve 11 and the second shutoff valve 13 are air-operated opening-closing valves. The first shutoff valve 11 and the second shutoff valve 13 can control even high-temperature gasses of 120° C. or higher. Further, for the first shutoff valve 11 and the second shutoff valve 13, for example, high-speed valves capable of opening and closing in several-msec cycles are adopted. In general, a valve used in a pipe generally has a bore diameter of ¼ inch of the pipe diameter. In contrast, each of the first shutoff valve 11 and the second shutoff valve 13 is a valve with a bore diameter of, for example, ⅜ inch of the pipe diameter, increasing a Cv value. The Cv values of the first shutoff valve 11 and the second shutoff valve 13 are 0.6, for example. Thus, since the first shutoff valve 11 and the second shutoff valve 13, each of which has such a high Cv value and can operate at high speed and high frequency, are respectively placed upstream and downstream of the tank 12, the flow rate control device 1 can suppress pulsations caused by the opening and closing actions of the first shutoff valve 11 and the second shutoff valve 13. In addition, the flow rate control device 1 allows gas to flow more easily than a thermal mass flow controller having a restricted section and hence can quickly supply the gas to the chamber 230.

During a process, the flow rate control device 1 repeats a pulse shot, at high speed, of causing the first shutoff valve 11 to open and close and, after that, causing the second shutoff valve 13 to open and close in order to control the flow rate of gas to a target flow rate. In the present description, the target flow rate is defined as a volume flow rate of gas to be exhausted through the second shutoff valve 13 per unit time. Therefore, the flow rate control device 1 is located near the chamber 230. For example, the second shutoff valve 13 and the chamber 230 are connected directly to each other or coupled through a pipe having a length of 2 in or less. The first shutoff valve 11 and the second shutoff valve 13 are not limited to the air-operated opening-closing valves and may be for example electromagnetic opening-closing valves.

The flow rate control device 1 in the present embodiment is controlled by a controller 15 to operate. The controller 15 is communicatively coupled to the first shutoff valve 11, the second shutoff valve 13, and the pressure sensor 14. The controller 15 is one example of a "controller".

The controller 15 is a well-known microcomputer provided with a CPU 21 and a memory 22. The memory 22 includes a nonvolatile memory and a volatile memory. The memory 22 stores various programs and data. The CPU 21 executes various processings by running the programs stored in the memory 22 while temporarily storing data in the memory 22.

For example, the memory 22 stores a control program 31 for controlling the operations of the flow rate control device 1. The control program 31 obtains an optimal pressure in a certain process, regulates the pressure in the tank 12 to the optimal pressure before execution of a next process, and then executes a flow rate control processing for the next process. The flow rate control processing will be described later in detail. The control program 31 is one example of a "program".

The non-volatile memory of the memory 22 stores data to be used for the control program 31. For example, the memory 22 stores an optimal pressure that represents the best pressure for regulating regulate the volume flow rate to a target flow rate. Further, the memory 22 stores for example an optimal filling time that represents the best filling time for regulating the volume flow rate to the target flow rate. For the optimal pressure and the optimal filling time, initial values may be stored when the control program 31 is installed, or alternatively may be left blank. The optimal pressure and the optimal filling time may be blanked when the flow rate control device 1 is powered on or powered off. The optimal pressure and the optimal filling time are updated as needed during execution of a process.

The controller 15 is further provided with a timer 23 for measuring time and a communication interface 24 (hereinafter, abbreviated to a "communication IF 24") for communication with external devices. The controller 15 is communicatively coupled, through the communication IF 24, to a higher-level controller 500 for controlling operations of a semiconductor manufacturing device. The controller 15 may be connected to the higher-level controller 500 by wire or wireless communication.

The flow rate control device 1 configured as above may be unitized in which the filter 16, the first shutoff valve 11, the second shutoff valve 13, the pressure sensor 14, and the controller 15 are connected to each other and installed together in a housing not shown. In this case, the flow rate control device 1 is easy to handle and needs no wiring work excepting connecting the communication IF 24 to the higher-level controller 500.

However, the controller 15 may be located outside the housing not shown, for example, incorporated in an external controller, such as the higher-level controller 500. Further, the control program 31 may be installed in the higher-level controller 500 so that the higher-level controller 500 functions as the controller 15, and the higher-level controller 500 serves as a controller for controlling the operations of the flow rate control device.

<Pulse Shots>

Figure 2:
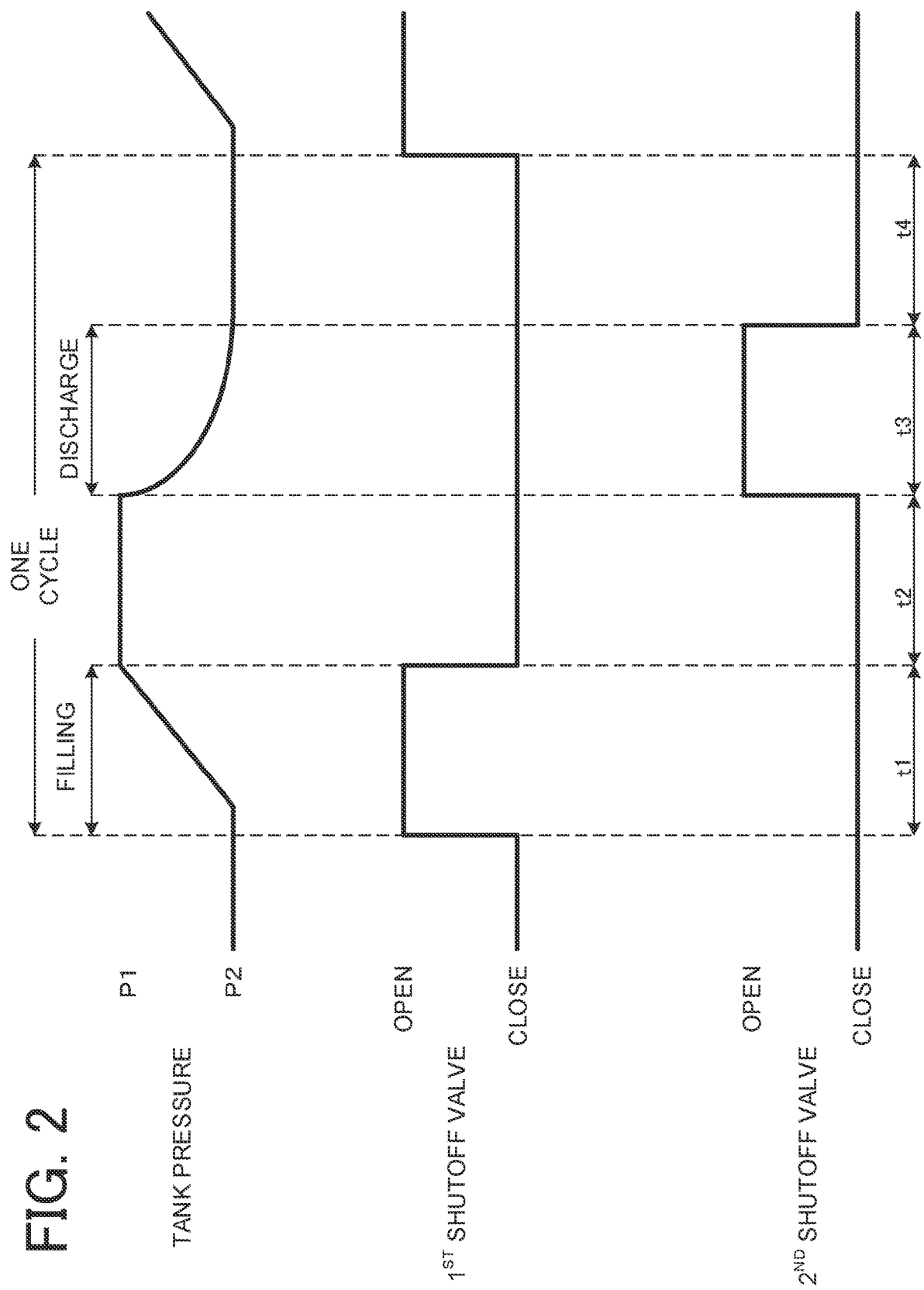
FIG. 2 is a diagram showing pulse shots.

Pulse shots to be performed in the flow rate control device 1 will be described below. FIG. 2 is a diagram showing the pulse shot. The flow rate control device 1 repeats pulse shots so that one cycle of each pulse shot is defined as a period from opening to the next opening of the first shut off valve 11. For example, when forming a film on a wafer using the ALD, the cycle of the operations (a) to (d) described above is repeated several hundred times for each wafer. In this case, for example, in the process in (a), TMA is supplied to the chamber 230 for several tens msec in each supply.

In each pulse shot, while the second shutoff valve 13 is closed, the first shutoff valve 11 is opened to fill gas supplied from the gas source 211 to the tank 12. When the first shutoff valve 11 is then closed, the tank 12 forms a sealed space that blocks inflow and outflow of gas. Thereafter, when the second shutoff valve 13 is opened and closed, the gas filled in the tank 12 is discharged through the second shutoff valve 13 and supplied to the chamber 230. The tank 12 is supplied with gas through only the first shutoff valve 11. When a discharge time t3 for keeping the second shutoff valve 13 open is constant, the flow rate control device 1 changes a filling time t1 for keeping the first shutoff valve 11 open to change the volume flow rate of gas to be discharged through the second shutoff valve 13.

The flow rate control device 1 adjusts the filling time t1 in each pulse shot based on a pressure difference between an after-filling pressure P1 indicating the pressure in the tank 12 after gas is supplied thereto and an after-discharge pressure P2 indicating the pressure in the tank 12 after gas is discharged therefrom.

Specifically, after closing the first shutoff valve 11, the flow rate control device 1 measures the pressure in the tank 12 with the pressure sensor 14 before opening the second shutoff valve 13, and obtains the after-filling pressure P1. The first shutoff valve 11 may cause a response delay when closing. Further, the pressure in the tank 12 right after closing of the first shutoff valve 11 is unstable due to adiabatic compression. Therefore, the flow rate control device 1 obtains the after-filling pressure P1 after a lapse of a first settling time t2 from closing of the first shutoff valve 11.

After closing the second shutoff valve 13, the flow rate control device 1 measures the pressure in the tank 12 with the pressure sensor 14 before opening the first shutoff valve 11, and obtains the after-discharge pressure P2. The second shutoff valve 13 may cause a response delay when closing. The pressure in the the tank 12 right after closing of the second shutoff valve 13 is unstable due to adiabatic expansion. Therefore, the flow rate control device 1 obtains the after-discharge pressure P2 after a lapse of a second settling time t4 from closing of the second shutoff valve 13.

The flow rate control device 1 calculates a current volume flow rate of gas based on a pressure difference between the after-filling pressure P1 and the after-discharge pressure P2 which are obtained as above. The flow rate control device 1 then adjusts the filling time t1 to be used in a next pulse shot according to a difference between the gas target flow rate designated from the higher-level controller 500 and the current gas volume flow rate calculated above, and changes the manner of the next pulse shot.

When the volume flow rate is less than the target flow rate, for example, the flow rate control device 1 sets longer the filling time t1 in the next pulse shot. This increases the amount of gas to be supplied to the tank 12 in the next pulse shot, increasing the volume flow rate. In contrast, when the volume flow rate is more than the target flow rate, the flow rate control device 1 sets shorter the filling time t1 in the next pulse shot. This decreases the amount of gas to be supplied to the tank 12 in the next pulse shot, decreasing the volume flow rate. Furthermore, if the volume flow rate is equal to the target flow rate, the filling time t1 in the next pulse shot is set equal to that in the current pulse shot. Accordingly, the gas to be filled in the tank 12 in the next pulse shot is equal to that in the current pulse shot and the volume flow rate is maintained.

When pulse shots are performed, the pressure in the tank 12 may vary at the start of filling gas. For the same filling time t1, the after-filling pressure P1 varies depending on the pressure at the start of filling gas and it takes long to adjust the volume flow rate to the target flow rate.

Figure 3:
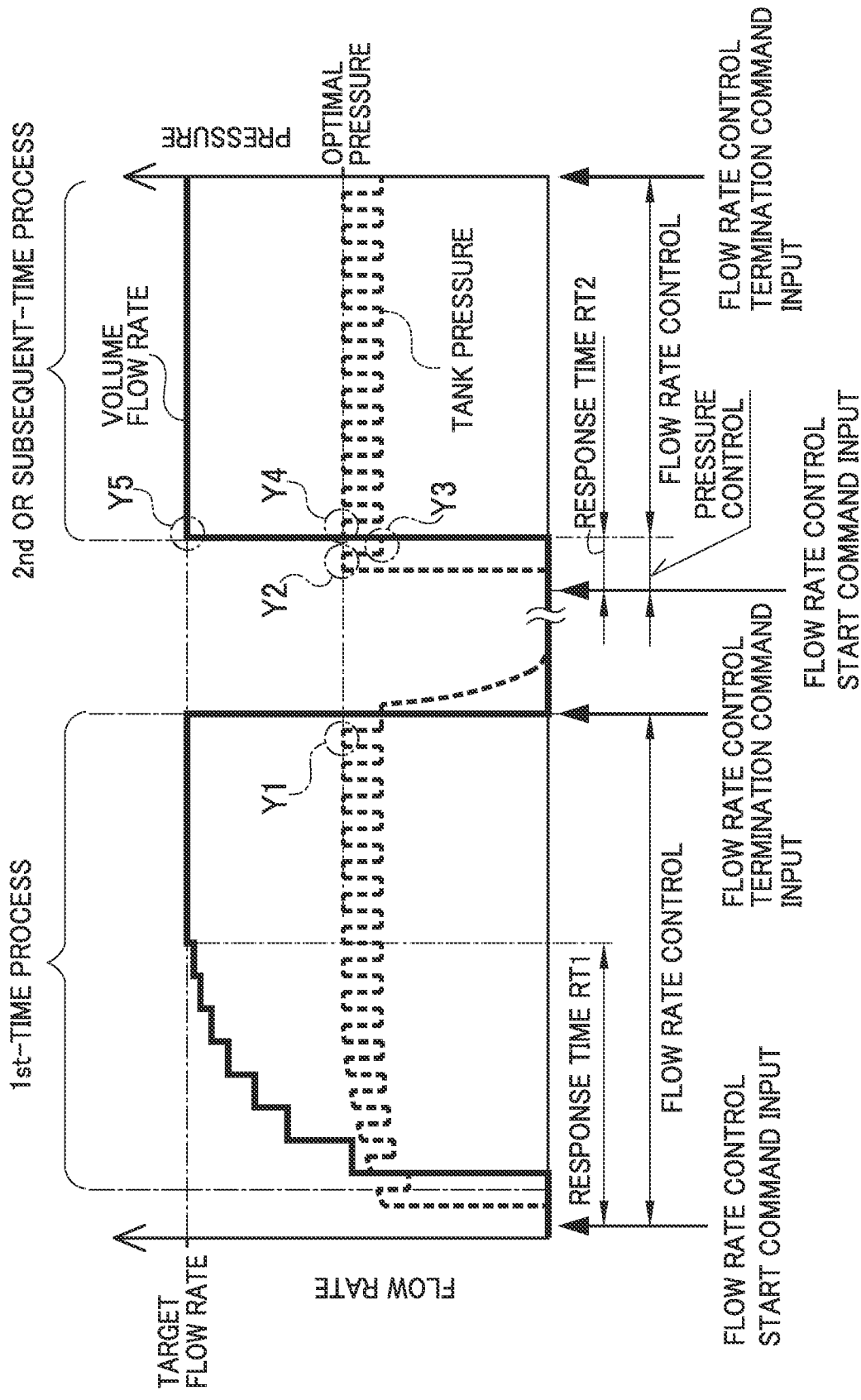
FIG. 3 is a conceptual diagram describing flow rate variations and pressure fluctuations.

In the present embodiment, therefore, as shown in FIG. 3, for example, the after-filling pressure P1 obtained when the volume flow rate of gas is adjusted to the target flow rate in a certain process is stored as an optimal pressure Px in the memory 22 (see Y1) and, before execution of a first pulse shot in a subsequent process, the pressure in the tank 12 is controlled to the optimal pressure (see Y2), and then gas is discharged (see Y3). In the first pulse shot, accordingly, the pressure in the tank 12 at the start of gas filling can be equal to that in the pulse shot that adjusts the volume flow rate to the target flow rate. In each process, therefore, the amount of gas needed to adjust the volume flow rate to the target flow rate is supplied at once to the tank 12 from the first pulse shot to adjust the pressure in the tank 12 (Y4) without the need to increase the volume flow rate of gas in stages from the start of the process until the target flow rate is reached. In each process, therefore, it is possible to supply gas controlled at the target flow rate from the first pulse shot, resulting in improved response (see Y5).

<Description of Operations of the Pulse Shot-Type Flow Rate Control Device: Control Processing>

Figure 4:
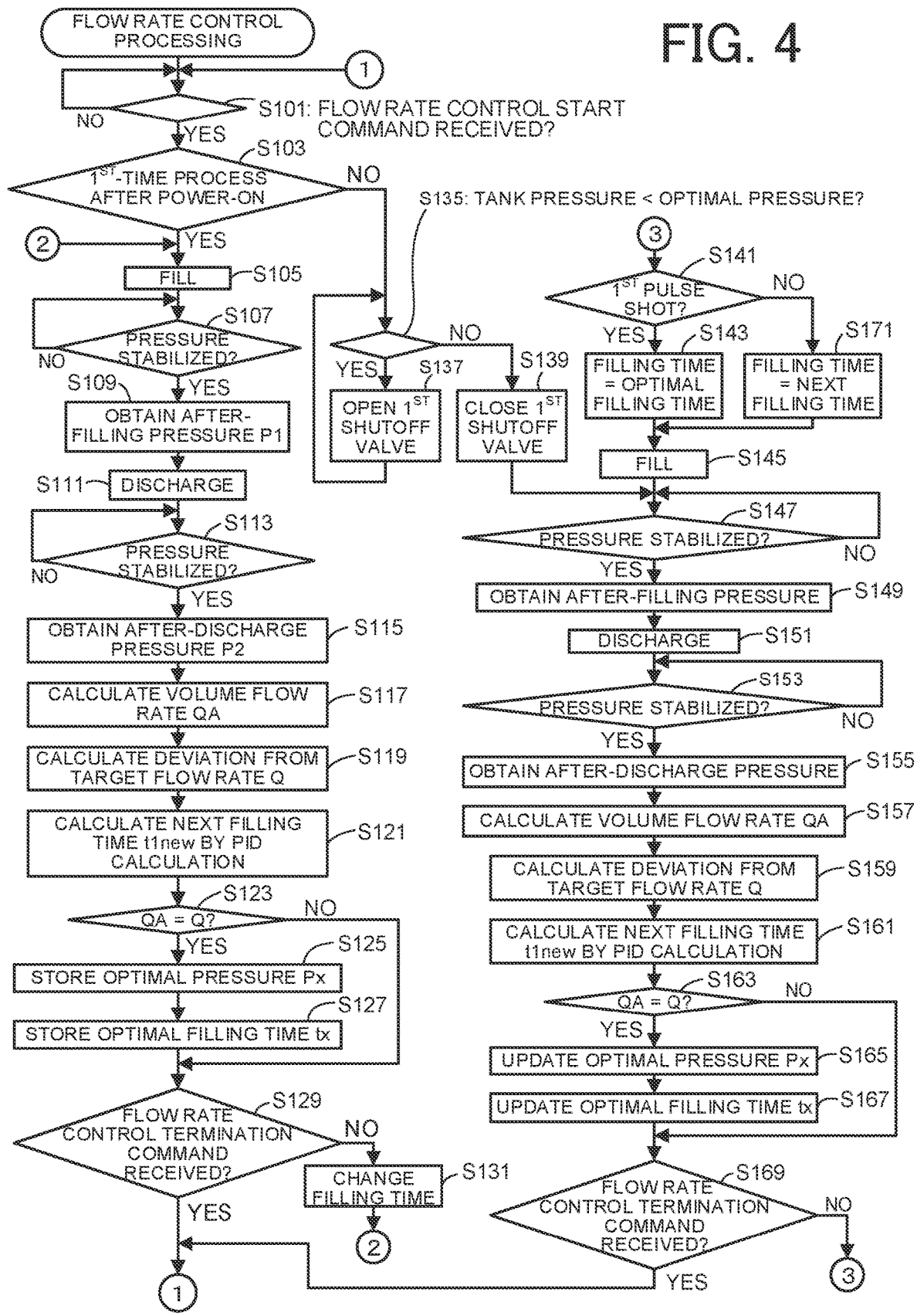
FIG. 4 is a flowchart describing the steps of a flow rate control processing.
Figure 5:
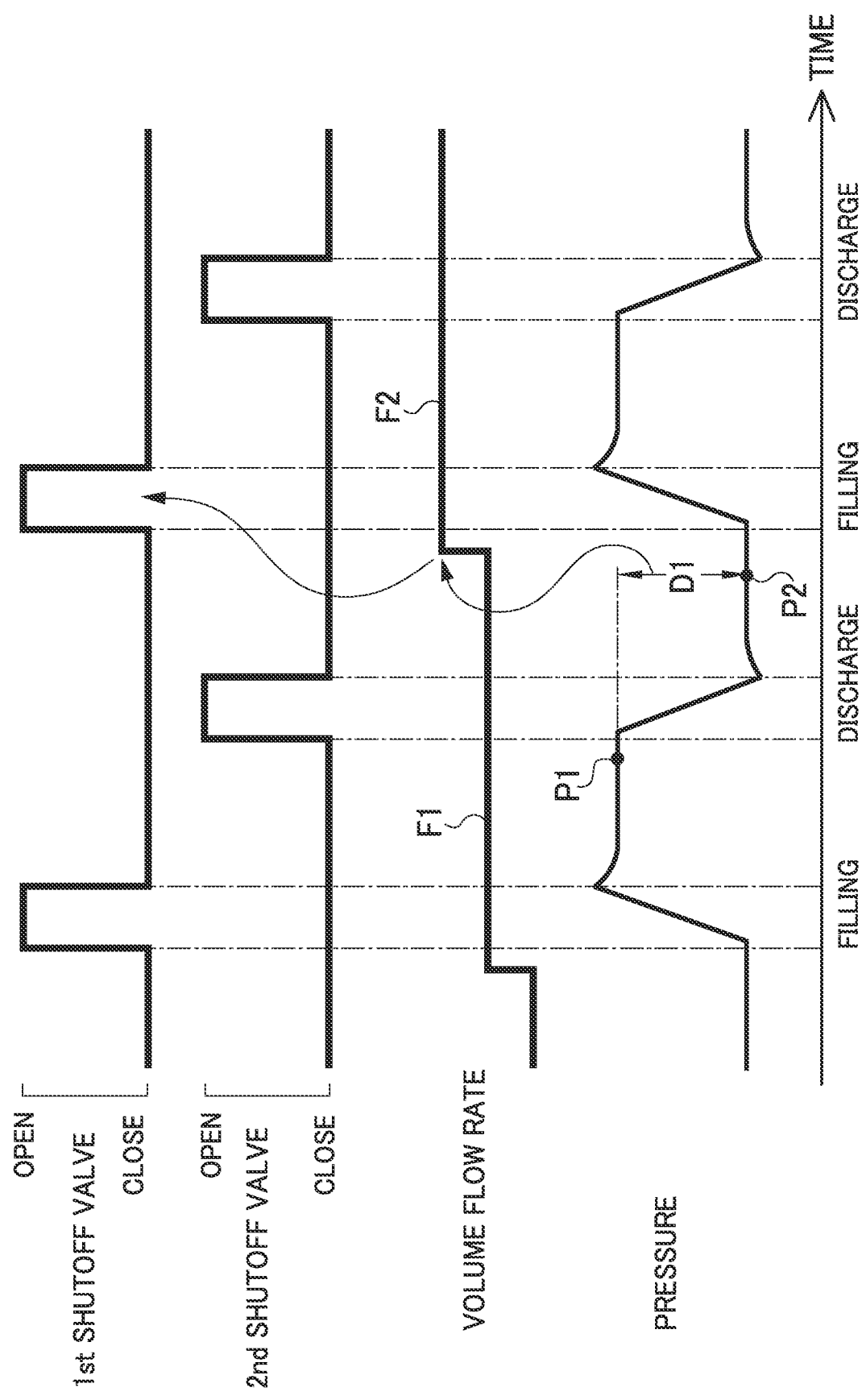
FIG. 5 is a sequence diagram of a conventional pulse shot-type flow rate control device.
Figure 6:
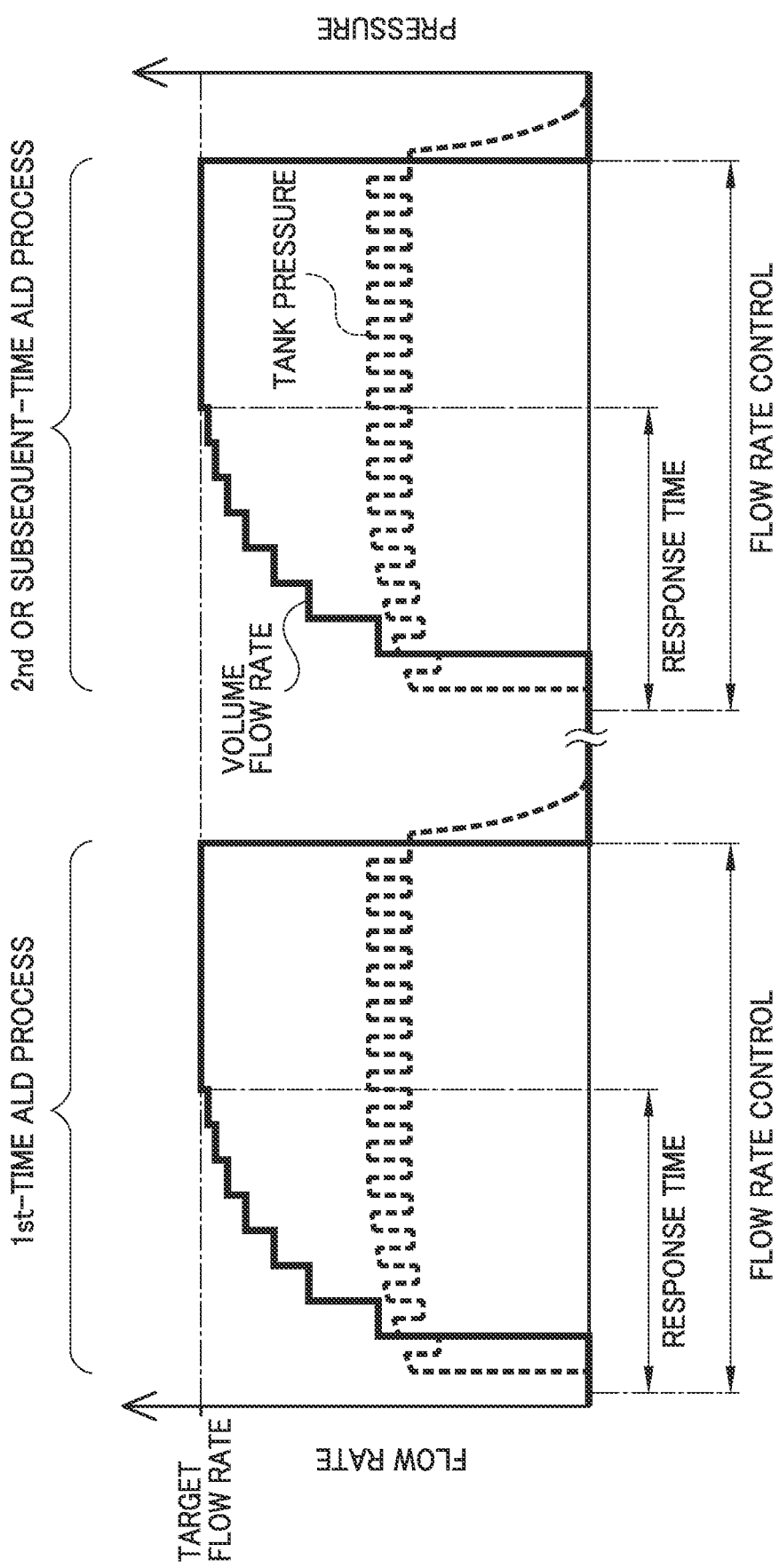
FIG. 6 is a diagram showing an example of flow rate control in the conventional pulse shot-type flow rate control device.

The steps of the flow rate control device 1 will be described below. FIG. 4 is a flowchart showing the steps of the control processing. Upon power-on of the flow rate control device 1, the CPU 21 starts the control program 31 to execute the flow rate control processing shown in FIG. 4.

The CPU 21 first determines whether or not a flow rate control start command is received (S101). For example, the higher-level controller 500 transmits the flow rate control start command to the flow rate control device 1A to start a process for supplying TMA to the chamber 230. Upon completion of formation of one layer of film on a wafer, the higher-level controller 500 transmits a flow rate control termination command to the flow rate control device 1A to terminate the process. In the case where the flow rate control device 1 is equipped with an operating unit, the CPU 21 may receive the flow rate control start command and the flow rate control termination command through the operating unit.

When the CPU 21 of the flow rate control device 1 does not receive the flow rate control start command transmitted from the higher-level controller 500 through the communication IF 24, for example, the CPU 21 determines that the flow rate control start command is not received (S101: NO). In this case, the CPU 21 waits without starting the process.

In contrast, when the CPU 21 receives the flow rate control start command transmitted from the higher-level controller 500 through the communication IF 24, for example, the CPU 21 determines that the flow rate control start command is received (S101: YES). In this case, the CPU 21 determines whether or not the process is a first-time process after power-on (S103). The CPU 21 has the function of counting the number of processes executed during a period from power-on to power-off, which is hereinafter referred to as "the number of process executions". The CPU 21 resets the number of process executions on power-on or power-off, and counts the number of process executions every time the flow rate control start command is received. If the number of process executions is 1, the CPU 21 determines that it is the first-time process after power-on (S103: YES).

After determining that it is the first-time process, the CPU 21 supplies gas to the tank 12 (105). Specifically, the first shutoff valve 11 and the second shutoff valve 13 are in a closed position at the time when the flow rate control start command is received. The CPU 21 thus opens the first shutoff valve 11. The CPU 21 measures, using the timer 23, the time for maintaining the first shutoff valve 11 open, which will be referred to as a "first opening-operation maintaining time. The CPU 21 keeps the first shutoff valve 11 open until the first opening-operation maintaining time reaches the filling time t1. To this filling time t1 for the first pulse shot in the first-time process, for example, an optimal filling time tx stored in the memory 22 is assigned. This filling time t1 may be a fixed value registered in advance in the control program 31 or a variable value automatically set according to the target flow rate. Further, the filling time t1 may be a variable value such as the time received from the higher-level controller 500 or the time input through the operating unit of the flow rate control device 1 if including the operating unit. When detecting that the filling time t1 has elapsed using the timer 23, the CPU 21 closes the first shutoff valve 11. At the same time as the termination of gas filling, the CPU 21 resets the timer 23.

After completion of gas filling, the CPU 21 determines whether or not the pressure in the tank 12 has stabilized (S107). In other words, the CPU 21 determines whether or not the first settling time t2 elapses. In the present embodiment, the discharge time t3 and the second settling time t4 are fixed. Further, the cycle of pulse shots is constant. Thus, when the filling time t1 is set, the first settling time t2 is automatically decided. After closing the first shutoff valve 11, the CPU 21 starts measuring the time using the timer 23. When the time measured by the timer 23 does not reach the first settling time t2, the CPU 21 determines that the pressure in the tank 12 has not stabilized yet (S107: NO), and waits.

In contrast, when the time measured by the timer 23 reaches the first settling time t2, the CPU 21 determines that the pressure in the tank 12 has stabilized (S107: YES), and thus obtains the after-filling pressure P1 (S109). Specifically, the CPU 21 measures the pressure in the tank 12 by the pressure sensor 14 at a lapse of the first settling time t2, and temporarily stores the measured pressure as the after-filling pressure P1 in the memory 22.

The CPU 21, which has obtained the after-filling pressure P1, causes discharge of gas through the second shutoff valve 13 (S111). Specifically, the CPU 21 opens the second shutoff valve 13 immediately after obtaining the after-filling; pressure P1. The CPU 21 keeps the second shutoff valve 13 open during the discharge time t3. The chamber 230 is controlled to a vacuum atmosphere using a vacuum pump 240, which is a lower pressure than the tank 12. Accordingly, the gas filled in the tank 12 is discharged from the tank 12 toward the chamber 230 at the same time as opening of the second shutoff valve 13. The discharge time t3 is determined in advance as described above. The CPU 21 measures, using the timer 23, the second opening-operation maintaining time that is the time for maintaining the second shutoff valve 13 open. The CPU 21 keeps the second shutoff valve 13 open until the second opening-operation maintaining time reaches the discharge time t3. After a lapse of the discharge time t3, the CPU 21 closes the second shutoff valve 13 and terminates discharge of gas. At the same time as the termination of gas discharge, the CPU 21 resets the timer 23.

After the termination of gas discharge, the CPU 21 determines whether or not the pressure in the tank 12 has stabilized (S113). That is, the CPU 21 determines whether or not the second settling time t4 elapses. The CPU 21 closes the second shutoff valve 13 and then starts measuring the time using the timer 23. When the time measured by the timer 23 does not reach the second settling time t4, the CPU 21 determines that the pressure has not stabilized yet (S113: NO), and waits.

In contrast, when the time measured with the timer 23 reaches the second settling time t4, the CPU 21 determines that the pressure has stabilized (S113: YES). Then, the CPU 21 obtains the after-discharge pressure P2 (S115). Specifically, the CPU 21 measures the pressure in the tank 12 by the pressure sensor 14 at a lapse of the second settling time t4, and temporarily stores the measured pressure as the after-discharge pressure P2 in the memory 22.

Subsequently, the CPU 21 calculates, using the following equation 1, a volume flow rate QA of the gas exhausted through the second shutoff valve 13 by the relevant pulse shot (S117). For example, the flow rate control device 1 obtains the current volume flow rate QA, per unit time, of the gas discharged through the second shutoff valve 13.

$$\text{Volume flow rate} = \text{Discharge amount} \times \text{The number of pulse shots} \quad \text{(Equation 1)}$$

The number of pulse shots is determined based on the time of a process and the cycle of pulse shots. The discharge amount is obtained by the following equation 2, wherein ΔP is a pressure difference, P is an atmospheric pressure (101.3 kPa), V is a volume (cc) of the tank 12, and T is a fluid temperature (° C.). T denotes the temperature of gas supplied to the chamber 230.

$$\text{Discharge amount} = \Delta P/P \times V \times 273/(273+T) \quad \text{(Equation 2)}$$

ΔP: Pressure difference=P1−P2 [kPa]
P: Atmospheric pressure=101.3 [kPa]
V: Tank volume [cc]
T: Fluid temperature [° C.]

In the flow rate control device 1, P and V are specified values. For example, if T is set to 20° C., the discharge amount shall be calculated by 20° C. conversion. The pressure difference ΔP is a difference between the after-filling pressure P1 obtained in S109 and the after-discharge pressure P2 obtained in S115. Thus, the discharge amount varies according to the pressure difference ΔP between the after-filling pressure P1 and the after-discharge pressure P2.

The CPU 21 substitutes the after-filling pressure P1 and the after-discharge pressure P2, which are temporarily stored in the memory 22 in S109 and S115, into the equation 2 described above to calculate the discharge amount. The CPU 21 assigns the number of pulse shots in the relevant process to the number of pulse shots in the equation 1, and further multiplies the number by the discharge amount obtained in the equation 2 to calculate the volume flow rate QA.

Subsequently, the CPU 21 calculates a deviation between the calculated volume flow rate QA and the target flow rate Q (S119). For example, the higher-level controller 500 attaches the target flow rate Q of the process to be executed to the flow rate control start command transmitted to the flow rate control device 1. The CPU 21 compares the target flow rate Q attached to the flow rate control start command with the volume flow rate QA calculated in S117 and calculates a deviation between the volume flow rate QA and the target flow rate Q.

Thereafter, the CPU 21 calculates a next filling time t1new by the PID calculation (S121). That is, the CPU 21 calculates the next filling time t1new by the following equation 3, wherein Kp is a proportional constant, Ki is an integral constant, Kd is a derivative constant, e(t) is a current deviation, and e(t−1) is a previous deviation.

$$t1new \rightarrow t1 + Kp^*e(t) + Ki^*\int_0^t e(t)dt + Kd^*(e(t)-e(t-1)) \quad \text{(Equation 3)}$$

Kp: Proportional constant
Ki: Integral constant
Kd: Derivative constant
e(t): Current deviation
e(t−1): Previous deviation For the tank 12, the filling amount of gas to be supplied to the tank 12 is adjusted by the opening/closing operations of the first shutoff valve 11. Thus, when the discharge time t3 and the second settling time 14 are constant, changing of the filling time t1 can regulate the volume flow rate QA of gas to be exhausted through the second shutoff valve 13. As above, the next filling time t1 new is calculated and the manner of the current pulse shot is replaced by the manner of the next pulse shot, so that the volume flow rate QA comes closer to the target flow rate Q.

After calculation of the next filling time t1new in S121, the CPU 21 determines whether or not the volume flow rate QA calculated in S117 is equal to the target flow rate Q in the relevant process (S123). When these values are determined not to be equal (S123: NO), the CPU 21 determines whether or not the flow rate control termination command is received (S129). When the CPU 21 does not receive the flow rate control termination command transmitted from the higher-level controller 500 through the communication IF 24, the CPU 21 determines that the flow rate control termination command is not received (S129: NO). In this case, the CPU 21 assigns the next filling time t1new calculated in S121 to the filling time t1 to change the filling time t1 (S131). Then, the CPU 21 returns to the processing in S105 and performs a next pulse shot.

The CPU 21 repeats the processings in S105 to S131 until the volume flow rate QA is adjusted to the target flow rate Q (S123: YES), and stores the optimal pressure Px in the memory 22 (S125). Specifically, the CPU 21 stores, as the optimal pressure Px in the memory 22, the after-filling pressure P1 measured when the pulse shot that adjusts the volume flow rate QA to the target flow rate Q is performed. That is, the after-filling pressure P1 measured in the relevant pulse shot is stored as the optimal pressure Px. In this case, for example, when the optimal pressure Px is already stored in the memory 22, the CPU 21 overwrites the existing optimal pressure Px with the after-filling pressure P1. Further, for example, when the optimal pressure Px in the memory 22 is blanked at the time of power-on, the after-filling pressure P1 is newly stored as the optimal pressure Px.

Subsequently, the CPU 21 stores the optimal filling time tx in the memory 22 (S127). That is, the CPU 21 stores, as the optimal filling time tx in the memory 22, the filling time t1 used in the pulse shot that adjusts the volume flow rate QA to the target flow rate Q. In other words, the filling time t1 used in the relevant pulse shot is stored as the optimal filling time tx. In this case, for example, when the optimal filling time tx is already stored in the memory 22, the CPU 21 overwrites the existing optimal filling time tx with the filling time t1. Further, for example, when the optimal filling time tx in the memory 22 is blanked at the time of power-on, the filling time t1 is newly stored as the optimal filling time tx. The processings in S125 and S127 may be performed in the reversed order.

The CPU 21 then determines whether or not the flow rate control termination command is received (S129). When the CPU 21 receives the flow rate control termination command transmitted from the higher-level controller 500 through the communication IF 24, the CPU 21 determines that the flow rate control termination command is received (S129: YES) and returns to the processing in S101. Specifically, the CPU 21 receives a next flow rate control start command and waits for the start of a next process.

When the CPU 21 executes the first-time process and determines that the flow rate control start command is received (S101: YES), the natural number, 2 or larger, is set as the number of process executions. In this case, the CPU 21 determines that it is not the first-time process after power-on (S103: NO), and determines whether or not the pressure in the tank 12 is lower than the optimal pressure Px (S135). Specifically, the CPU 21 obtains the pressure measured by the pressure sensor 14 and compares it with the optimal pressure Px stored in the memory 22.

When it is determined that the pressure in the tank 12 is lower than the optimal pressure Px (S135: YES) while the first shutoff valve 11 and the second shutoff valve 13 are closed, the CPU 21 causes the first shutoff valve 11 to open (S137). Thus, the tank 12 starts to be filled with the gas supplied from the gas source 211.

The CPU 21, after opening the first shutoff valve 11, returns to the processing in S135. The CPU 21 maintains the first shutoff valve 11 open for a period in which the pressure in the tank 12 is lower than the optimal pressure Px (S135: YES, S137). Accordingly, the tank 12 continues to be supplied with gas and thus the pressure in the tank 12 rises.

When the pressure rises to the optimal pressure Px or higher and the CPU 21 determines that the pressure in the tank 12 is not lower than the optimal pressure Px (S135: NO), the CPU 21 closes the first shutoff valve 11 (S139). Accordingly, the tank 12 forms a sealed space that blocks inflow and outflow of gas, so that the pressure in the tank 12 is adjusted to the optimal pressure Px regardless of the original pressure of the gas source 211.

Thereafter, the CPU 21 performs the processings in S147 to S161 as with the above-described processings in S107 to S121 to discharge the gas filled in the tank 12 through the second shutoff valve 13. Accordingly, before the first pulse shot is performed, the pressure in the tank 12 is equal to the pressure after the pulse shot that adjusts the volume flow rate QA to the target flow rate Q.

The CPU 21 performs the processings in S163 to S169 as with the processings in S123 to S129, and advances to the processing in S141. As an alternative, during the pressure control, the CPU 21 may proceed to the processing in S141 after the processing in S161 without performing the processings in S163 to S169.

In S141 after controlling the pressure in the tank 12, the CPU 21 determines whether or not it is the first pulse shot. The pulse shot to be performed after the processings in S135 to S139 and S147 to S169 are executed to control the pressure in the tank 12 is the first pulse shot in the relevant process. In this case (S141: YES), the CPU 21 assigns the optimal filling time tx stored in the memory 22 to the filling time t1 (S143). The CPU 21 further feeds gas in the tank 12 according to the filling time t1. The processing in S145 is the same as S105 and the details thereof are omitted. The tank 12 comes into the same state as right after execution of the pulse shot that adjusts the volume flow rate QA to the target flow rate Q. Further, the filling time t1 is equal to the filling time used in that pulse shot. The tank 12 is highly likely to be supplied with the amount of gas required to adjust the volume flow rate QA to the target flow rate Q.

After completion of filling, the CPU 21 performs the processings in S147 to S169 as with the above-described S107 to S129. Accordingly, the gas filled in the tank 12 by the first pulse shot is exhausted through the second shutoff valve 13. Thus, the tank 12 is highly likely to be supplied with the amount of gas required to adjust the volume flow rate QA to the target flow rate Q. The discharge time t3 is constant. The first pulse shot is thus more likely to allow the volume flow rate QA to be adjusted to the target flow rate Q.

When the volume flow rate QA is equal to the target flow rate Q (S163: YES), the CPU 21 updates the optimal pressure Px with the after-filling pressure P1 in the relevant pulse shot (S165). In other words, before second and subsequent-time processes are executed, the optimal pressure Px is already stored. The CPU 21 therefore overwrites the existing optimal pressure Px stored in the memory 22 with the after-filling pressure P1 obtained in the relevant pulse shot.

Further, the CPU 21 updates the optimal filling time tx with the filling time t1 used in the relevant pulse shot (S167), and advances to the processing in S169. In other words, before the second and subsequent-time processes are executed, the optimal filling time tx is already stored in the memory 22. The CPU 21 therefore overwrites the existing optimal filling time tx stored in the memory 22 with the filling time t1 used in the relevant pulse shot. The processings in S165 and S167 may be performed in the reverse order. The processings in S165 and S167 may be executed only when the filling time t1 used in the relevant pulse shot is different from the existing optimal filling time tx.

When the CPU 21 determines that the volume flow rate QA is not equal to the target flow rate Q (S163: NO), the CPU 21 performs the processing in S169 without performing the processings in S165 and S167. When the flow rate control termination command is not received (S169: NO), the CPU 21 returns to the processing in S141 and performs a next pulse shot.

The pulse shot to be performed at this time is the second or subsequent pulse shot, not a first pulse shot (S141: NO). Then, the CPU 21 assigns the next filling time t1 new calculated in S161 to the filling time t1 (S171), and advances to the processing in S145. The CPU 21 performs the processings in S145 to S169 to exhaust gas through the second shutoff valve 13.

The first pulse shot is performed under the same conditions as the pulse shot that adjusts the volume flow rate QA to the target flow rate Q. Even if the volume flow rate QA is not adjusted to the target flow rate Q by the first pulse shot, therefore, the volume flow rate QA adjusted by the first pulse shot is a value approximate to the target flow rate Q. Thus, the next pulse shot likely allows the volume flow rate QA to match the target flow rate Q.

In the second or subsequent pulse shot, similarly, when the volume flow rate QA is equal to the target flow rate Q, the optimal pressure Px is updated with the after-filling pressure P1 obtained in the relevant pulse shot, and the optimal filling time tx is updated with the filling time t1 used in the relevant pulse shot (S165 and S167). Accordingly, the optimal pressure Px and the optimal filling time tx in the memory 22 are replaced as needed by the values that reflect a change in the original pressure of the gas source 211 and others.

Upon receipt of the flow rate control termination command (S169: YES), the CPU 21 returns to the processing in S101. Then, the CPU 21 waits for reception of the flow rate control start command for performing a next process (S101: NO).

In the next process, the processings in S135 to S169 are performed using the optimal pressure Px stored in the memory 22 in the previous process to control the pressure in the tank 12 to the same state as after the volume flow rate QA is adjusted to the target flow rate Q before execution of the first pulse shot. In the next process, therefore, the volume flow rate QA is highly likely to be adjusted to the target flow rate Q from the first pulse shot.

The processings in S125 and S165 are one example of an optimal pressure storage processing and the processings in S127 and S167 are one example of an optimal filling time storage processing. The processings in S135 to S139 and S147 to S161 are one example of a pressure control processing. The processings in S141 to S171 are one example of a flow rate control processing. The processings in S143 and S171 are one example of a filling time control processing.

In the flow rate control device 1 in the present embodiment, as described above, for example, in the first-time process after power-on, the after-filling pressure P1 at which the volume flow rate QA is adjusted to the target flow rate Q is stored as the optimal pressure Px. In the second or subsequent-time process, the pressure in the tank 12 is controlled to the optimal pressure Px before the first pulse shot is performed, and then the second shutoff valve 13 is opened and closed. Thus, the tank 12 comes to the same state as that after execution of the pulse shot that controls the volume flow rate QA to the target flow rate Q. Accordingly, the first pulse shot allows the tank 12 to be filled with gas in the same manner as when the volume flow rate has been adjusted to the target flow rate, regardless of changes in the original pressure of the gas source and others, and the volume flow rate is highly likely to be adjusted to the target flow rate. According to the flow rate control device 1 in the present embodiment, it is possible to shorten the response time from the start of a process until the volume flow rate QA of gas stabilizes at the target flow rate Q, resulting in improved response.

The present invention is not limited to the foregoing embodiments and may be embodied in other specific forms. In the chamber 230, a film may be formed on a wafer by any other methods than the ALD. Further, the flow rate control device 1 may be applied to any devices, not limited to semiconductor production devices.

For example, the determination in the processing in S103 in FIG. 4 does not have to be made in the first-time process after power-on. That is, the optimal pressure storage processing does not have to be performed in the first-time process after power-on. However, when the optimal pressure storage processing in S125 is executed in the first-time process after power-on as in the foregoing embodiment, the response in each of the second and subsequent-time processes can be improved. Furthermore, when the optimal filling time storage processing in S127 is performed in the first-time process after power-on as in the foregoing embodiment, the response in each of the second and subsequent-time processes can be improved. This can contribute to higher throughput of semiconductor manufacturing equipment.

For example, the processing in S165 in FIG. 4 may be omitted and the optimal pressure Px may not be updated during execution of the flow rate control processing. However, when the processing in S165 is executed as above and the optimal pressure Px is updated in each process, the optimal pressure Px can reflect disturbances, the volume flow rate QA can be adjusted to the target flow rate Q or a value approximate to the target flow rate Q in the first pulse shot with high probability. In particular, updating the optimal pressure for every pulse shot as in the foregoing embodiment can facilitate the optimization of the optimal pressure Px.

For example, the processing in S127 in FIG. 4 may be omitted and the optimal filling time tx may not be stored. Further, the processing in S143 may be omitted and the optimal filling time tx may not be used for the filling time t1 in the first pulse shot. However, when the processings in S127 and S143 are executed to control the first shutoff valve 11 with the optimal filling time tx in the first pulse shot in each process in addition to the pressure control prior to each process, as in the foregoing embodiment, the volume flow rate QA can be adjusted to the target flow rate Q or a value approximate to the target flow rate Q from the first pulse shot with high probability, resulting in improved response.

The processing in S167 in FIG. 4 may be omitted and the optimal filling time tx may not be updated during execution of the flow rate control processing. However, when the processing in S167 is executed as above to update the optimal filling time tx in each process, the optimal filling time tx can reflect disturbances, so that the volume flow rate QA can be adjusted in the first pulse shot to the target flow rate Q or a value approximate to the target flow rate Q with high probability.

For example, the processing in S127 in FIG. 4 may be omitted and the optimal filling time tx may be stored in a different test mode from the process. However, when the processing in S127 is executed in the process for the processing in S125, that is, in the first-time process after power-on, the optimal pressure Px and the optimal filling time tx are stored in the same process, the optimal filling time tx does not need to be stored in the different test mode from the process, so that gas and time can be saved.

The determination processings in S107, S113, S147, and S153 are not limited to time but may be made based on fluctuations of the pressure measured by the pressure sensor 14. However, in the foregoing embodiment in which the determination is made based on the first settling time t2 and the second settling time t4, the tinning of obtaining the after-filling pressure P1 and the after-discharge pressure P2 can be easily controlled even when a pulse shot is performed with high speed and high frequency.

The higher-level controller 500 may control the number of process executions and provide a flow rate control start command attached with the number of process executions. In this case, the flow rate control device 1 may determine whether or not it is the first-time process in the processing in S103 in FIG. 4 based on the number of process executions transmitted from the higher-level controller 500.

Each of the processings in the flowchart described in the foregoing embodiment may be performed in the different order without causing inconsistency. A storage medium for storing the control program 31 is also a novel and useful invention.

In the present embodiment, the discharge time t3 is constant and the filling time t1 is adjusted to change the manner of repeating pulse shots to control the volume flow rate. As an alternative, it may be configured such that the filling time t1 is constant, and the discharge time t3 is adjusted to change the manner of repeating pulse shots to control the volume flow rate.

REFERENCE SIGNS LIST

1 Pulse shot-type flow rate control device
11 First shutoff valve
12 Tank
13 Second shutoff valve
14 Pressure sensor
15 Controller

The invention claimed is:

1. A pulse shot-type flow rate control device comprising:
a first shutoff valve connected to a gas source;
a second shutoff valve connected to the first shutoff valve;
a gas filling capacity between the first shutoff valve and the second shutoff valve; and
a pressure sensor for measuring a pressure in the gas filling capacity,
wherein two or more processes for controlling gas to a target flow rate are performed,
the first shutoff valve, the second shutoff valve, and the pressure sensor are connected communicatively to a controller that controls operations of the pulse shot-type flow rate control device,
in each of the processes, the controller executes a flow rate control processing of: repeating a pulse shot of causing the first shutoff valve to open and close and, after that, causing the second shutoff valve to open and close; calculating a volume flow rate of gas exhausted from the gas filling capacity based on a pressure after filling measured by use of the pressure sensor after the first shutoff valve is opened and closed to fill gas into the gas filling capacity and a pressure after discharge measured by use of the pressure sensor after the second shutoff valve is opened and closed to discharge gas from the gas filling capacity; and changing a manner of repeating the pulse shot to regulate the volume flow rate to the target flow rate, and the controller executes:
an optimal pressure storage processing of storing, as an optimal pressure, the pressure after filling measured by the pressure sensor when the pulse shot that regulates the volume flow rate to the target flow rate is performed in the flow rate control processing, and
the controller executes:
before a first pulse shot is performed in a subsequent process to a process in which the optimal pressure storage processing is executed, a pressure control processing of regulating the pressure in the gas filling capacity to the optimal pressure stored in the optimal pressure storage processing, and then opening and closing the second shutoff valve.

2. The pulse shot-type flow rate control device according to claim 1, wherein
the optimal pressure storage processing is executed in a first-time process after power-on, and
the pressure control processing is executed before the first pulse shot in a second or subsequent-time process after power-on.

3. The pulse shot-type flow rate control device according to claim 2, wherein the controller executes the optimal pressure storage processing in the flow rate control processing in the process performed immediately after the pressure control processing, and updates the optimal pressure.

4. The pulse shot-type flow rate control device according to claim 1, wherein
the controller executes:
an optimal filling time storage processing of: measuring an opening-operation maintaining time for keeping the first shutoff valve open in each pulse shot in the flow rate control processing; and storing, as an optimal filling time, the opening-operation maintaining time when the pulse shot that regulates the volume flow rate to the target flow rate is performed, and
the controller further executes:
for execution of the first pulse shot in the flow rate control processing in a subsequent process to the process in which the optimal filling time storage processing is executed, a filling time control processing of opening and closing the first shutoff valve with the optimal filling time stored in the optimal filling time storage processing.

5. The pulse shot-type flow rate control device according to claim 4, wherein the optimal filling time storage processing is performed in the same process as that in which the optimal pressure storage processing is performed.

6. The pulse shot-type flow rate control device according to claim 4, wherein the optimal filling time is stored in the first-time process after power-on and is used in the second or subsequent-time process after power-on.

7. The pulse shot-type flow rate control device according to claim 4, wherein the controller executes the optimal filling time storage processing in the flow rate control processing in the process in which the filling time control processing is performed, and updates the optimal filling time.

8. A pulse shot-type flow rate control method, using a pulse shot-type flow rate control device comprising:
a first shutoff valve connected to a gas source;
a second shutoff valve connected to the first shutoff valve;
a gas filling capacity between the first shutoff valve and the second shutoff valve; and
a pressure sensor for measuring a pressure in the gas filling capacity,
wherein operations of the pulse shot-type flow rate control device are controlled by a controller communicatively connected to the first shutoff valve, the second shutoff valve, and the pressure sensor, wherein the method causes the pulse shot-type flow rate control device to perform:

two or more processes for controlling gas to a target flow rate;

in each of the processes, a flow rate control step of: repeating a pulse shot of causing the first shutoff valve to open and close and, after that, causing the second shutoff valve to open and close; calculating a volume flow rate of gas exhausted from the gas filling capacity based on a pressure after filling measured by use of the pressure sensor after the first shutoff valve is opened and closed to fill gas into the gas filling capacity and a pressure after discharge measured by use of the pressure sensor after the second shutoff valve is opened and closed to discharge gas from the gas filling capacity; and changing a manner of repeating the pulse shot to regulate the volume flow rate to the target flow rate;

an optimal pressure storage step of storing, as an optimal pressure, the pressure after filling measured by the pressure sensor when the pulse shot that regulates the volume flow rate to the target flow rate is performed in the flow rate control step; and before a first pulse shot is performed in a subsequent process to a process in which the optimal pressure storage processing is executed, a pressure control step of regulating the pressure in the gas filling capacity to the optimal pressure stored in the optimal pressure storage step.

9. A program installed in a controller for controlling operations of a pulse shot-type flow rate control device comprising:

a first shutoff valve connected to a gas source;

a second shutoff valve connected to the first shutoff valve;

a gas filling capacity between the first shutoff valve and the second shutoff valve; and a pressure sensor for measuring a pressure in the gas filling capacity, wherein when the flow rate control device performs two or more processes for controlling gas to a target flow rate, the program causes the controller, in each of the processes, to execute:

a flow rate control processing of: repeating a pulse shot of causing the first shutoff valve to open and close and, after that, causing the second shutoff valve to open and close; calculating a volume flow rate of gas exhausted from the gas filling capacity based on a pressure after filling measured by use of the pressure sensor after the first shutoff valve is opened and closed to fill gas into the gas filling capacity and a pressure after discharge measured by use of the pressure sensor after the second shutoff valve is opened and closed to discharge gas from the gas filling capacity; and changing a manner of repeating the pulse shot to regulate the volume flow rate to the target flow rate, and the program causes the controller to execute:

an optimal pressure storage processing of storing, as an optimal pressure, the pressure after filling measured by the pressure sensor when the pulse shot that regulates the volume flow rate to the target flow rate is performed in the flow rate control processing, and the program further causes the controller to execute:

before a first pulse shot is performed in a subsequent process to a process in which the optimal pressure storage processing is executed, a pressure control processing of regulating the pressure in the gas filling capacity to the optimal pressure stored in the optimal pressure storage processing.

\* \* \* \* \*